US012673611B2

(12) United States Patent
Stapf et al.

(10) Patent No.: US 12,673,611 B2
(45) Date of Patent: Jul. 7, 2026

(54) HIDDEN MIRROR TETHER

(71) Applicant: Gentex Corporation, Zeeland, MI (US)

(72) Inventors: Alexander K. Stapf, Neckarsulm (DE); Andreas Kraus, Bad Friedrichshall (DE)

(73) Assignee: GENTEX CORPORATION, Zeeland, MI (US)

( * ) Notice: Subject to any disclaimer, the term of this patent is extended or adjusted under 35 U.S.C. 154(b) by 293 days.

(21) Appl. No.: 18/407,805

(22) Filed: Jan. 9, 2024

(65) Prior Publication Data

US 2024/0227673 A1     Jul. 11, 2024

Related U.S. Application Data

(60) Provisional application No. 63/479,372, filed on Jan. 11, 2023.

(51) Int. Cl.
| | |
|---|---|
| *G02B 7/182* | (2021.01) |
| *B60R 1/04* | (2006.01) |
| *B60R 1/12* | (2006.01) |
| *B60R 16/02* | (2006.01) |

(52) U.S. Cl.
CPC .............. *B60R 1/04* (2013.01); *B60R 1/1207* (2013.01); *B60R 16/0215* (2013.01); *B60R 2001/1253* (2013.01)

(58) Field of Classification Search
CPC ..... B60R 1/04; B60R 1/1207; B60R 16/0215; B60R 2001/1253; B60R 1/12
See application file for complete search history.

(56) References Cited

U.S. PATENT DOCUMENTS

| | | | | |
|---|---|---|---|---|
| 8,201,800 | B2 * | 6/2012 | Filipiak | .................... B60R 1/04 |
| | | | | 248/483 |
| 2005/0085100 | A1 | 4/2005 | Wada | |
| 2015/0334354 | A1 | 11/2015 | Uken et al. | |
| 2016/0159287 | A1 * | 6/2016 | Minikey, Jr. | .............. B60R 1/04 |
| | | | | 359/875 |
| 2017/0355312 | A1 | 12/2017 | Habibi et al. | |
| 2018/0345865 | A1 | 12/2018 | Maxwell | |
| 2019/0092238 | A1 | 3/2019 | Karner et al. | |
| 2021/0097864 | A1 * | 4/2021 | Zhao | ...................... G08G 1/205 |

FOREIGN PATENT DOCUMENTS

| | | | |
|---|---|---|---|
| DE | 202017103085 | U1 | 10/2017 |
| JP | 2005119562 | A | 5/2005 |
| WO | 2020190634 | A1 | 9/2020 |

* cited by examiner

*Primary Examiner* — Euncha P Cherry
(74) *Attorney, Agent, or Firm* — Price Heneveld LLP; Brian James Brewer

(57) ABSTRACT

A rearview mirror assembly for a vehicle includes a housing and a mounting bracket connected to the housing. A mounting member extends between a member first end configured to attach to an overhead structure of the vehicle and a connection end connected to the mounting bracket. A tether includes a first end connected to the mounting bracket. The tether extends at least partially through a hollow interior of the mounting member to a second end that is configured to attach to the overhead structure of the vehicle.

20 Claims, 7 Drawing Sheets

HIDDEN MIRROR TETHER

CROSS-REFERENCE TO RELATED APPLICATION

This application claims priority to and the benefit under 35 U.S.C. § 119(e) of U.S. Provisional Application No. 63/479,372, filed on Jan. 11, 2023, entitled "HIDDEN MIRROR TETHER," the disclosure of which is hereby incorporated herein by reference in its entirety.

FIELD OF THE DISCLOSURE

The present disclosure generally relates to a rearview mirror assembly with a tether, and, more particularly, to a full display rearview mirror assembly with a tether.

SUMMARY OF THE DISCLOSURE

According to one aspect of the present disclosure, a rearview mirror assembly for a vehicle includes a housing and a mounting bracket connected to the housing. A mounting member extends between a member first end configured to attach to an overhead structure of the vehicle and a connection end connected to the mounting bracket. A tether includes a first end connected to the mounting bracket. The tether extends at least partially through a hollow interior of the mounting member to a second end that is configured to attach to the overhead structure of the vehicle.

According to another aspect of the present disclosure, a rearview mirror assembly for a vehicle includes a housing and a mounting bracket connected to the housing. At least one electronic component and at least one printed circuit board ("PCB") is located in the housing that controls the functionality of the at least one electronic component. A mounting member extends between a member first end configured to attach to an overhead structure of the vehicle and a connection end connected to the mounting bracket. A tether includes a cord having a first end connected to the mounting bracket. The cord extends at least partially through a hollow interior of the mounting member to a second end that is configured to attach to the overhead structure of the vehicle. A power supply wiring extends at least partially through a hollow interior of the mounting member and is operably coupled to the at least one PCB.

According to yet another aspect of the present disclosure, a rearview mirror assembly for a vehicle includes a housing and a mounting bracket connected to the housing and defining a post. A mounting member extends between a member first end configured to attach to an overhead structure of the vehicle and a connection end connected to the mounting bracket. A tether includes a cord having a first end defining a loop extending around the post. The cord extends to a second end that is configured to attach to the overhead structure of the vehicle.

These and other features, advantages, and objects of the present disclosure will be further understood and appreciated by those skilled in the art by reference to the following specification, claims, and appended drawings.

DETAILED DESCRIPTION

Figure 1:
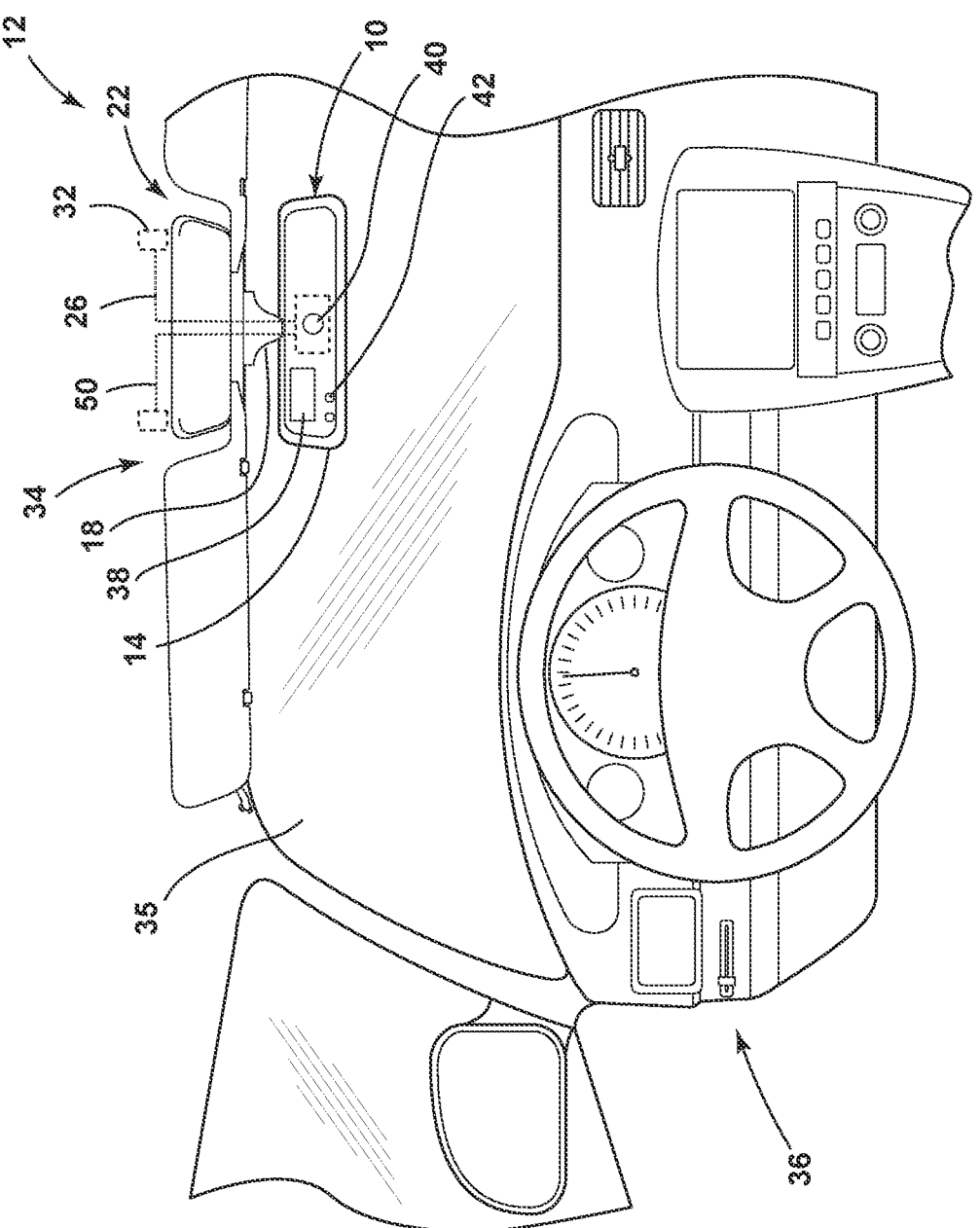
FIG. 1 is an interior view of a vehicle that includes a rearview mirror assembly with a tether in accordance with an aspect of the present disclosure.

The present illustrated embodiments reside primarily in combinations of method steps and apparatus components related to a full display rearview mirror assembly with a tether. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof, shall relate to the disclosure as oriented in FIG. 1. Unless stated otherwise, the term "front" shall refer to the surface of the device closer to an intended viewer of the device, and the term "rear" shall refer to the surface of the device further from the intended viewer of the device. However, it is to be understood that the disclosure may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-5, reference numeral 10 generally designates a rearview mirror assembly for a vehicle 12. The rearview mirror assembly 10 includes a housing 14 and a mounting bracket 16 connected to the housing 14. A mounting member 18 extends between a member first end 20 configured to attach to an overhead structure 22 of the vehicle 12 and a connection end 24 connected to the mounting bracket 16. A tether 26 includes a first end 28 connected to the mounting bracket 16. The tether 26 extends at least partially through a hollow interior 30 of the mounting member 18 to a second end 32 configured to attach to the overhead structure 22 of the vehicle 12.

With reference now to FIG. 1, the overhead structure 22 of the vehicle 12 may include an upper panel 34, a front window 35, or other locations within an interior cabin 36 of the vehicle 12. The rearview mirror assembly 10 may be a full display rearview mirror assembly that includes at least one electronic component. For example, the at least one electronic component may include a display 38, a camera 40, and a light source 42. Each electronic component adds additional weight to the rearview mirror assembly 10 that is secured by the tether 26 in the event that the rearview mirror assembly 10 becomes dislodged. The tether 26 anchors the rearview mirror assembly 10 to the overhead structure 22 of the vehicle 12.

Figure 2:
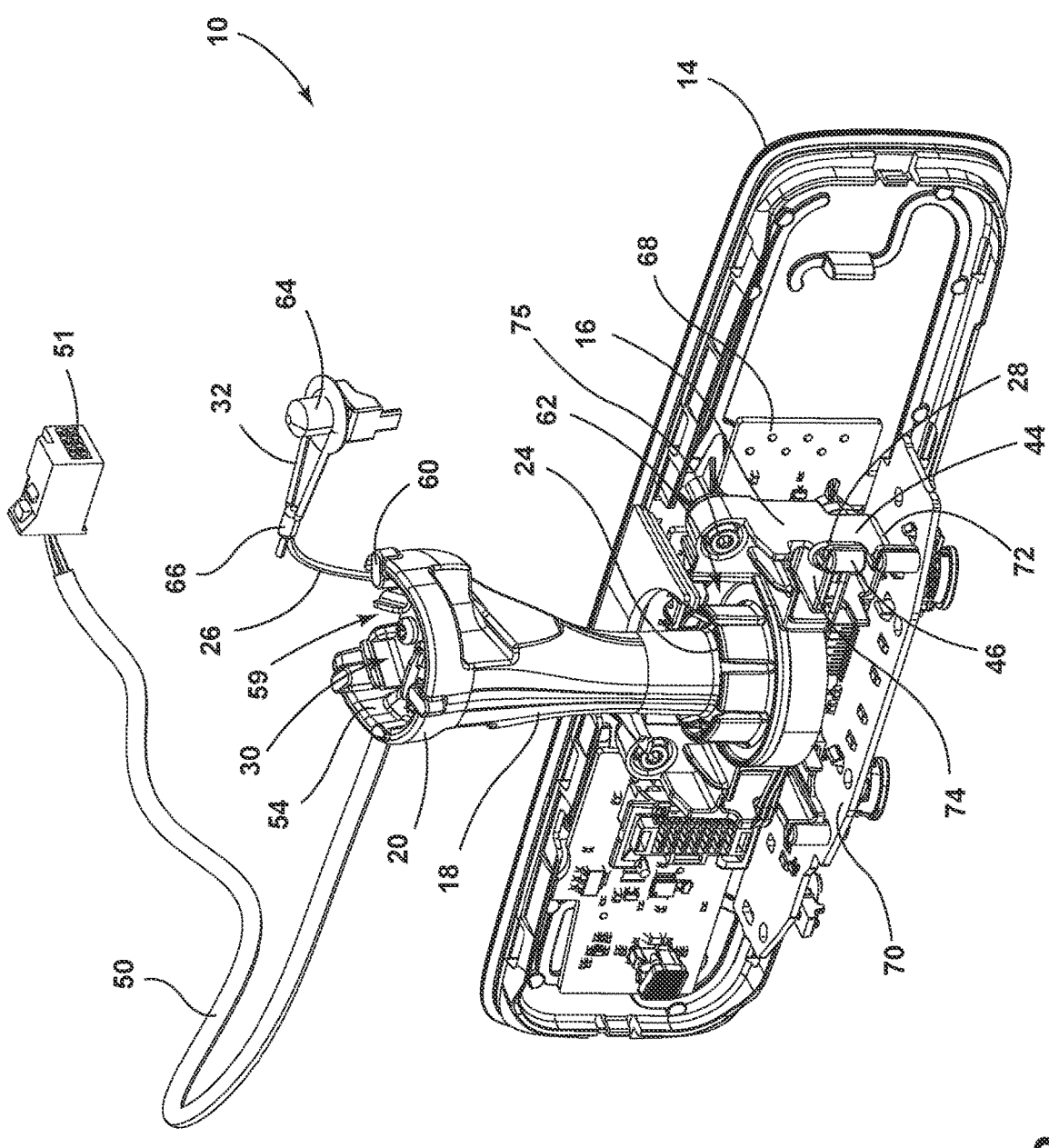
FIG. 2 is an upper perspective view of a rearview mirror assembly with a tether in accordance with an aspect of the present disclosure.
Figure 3:
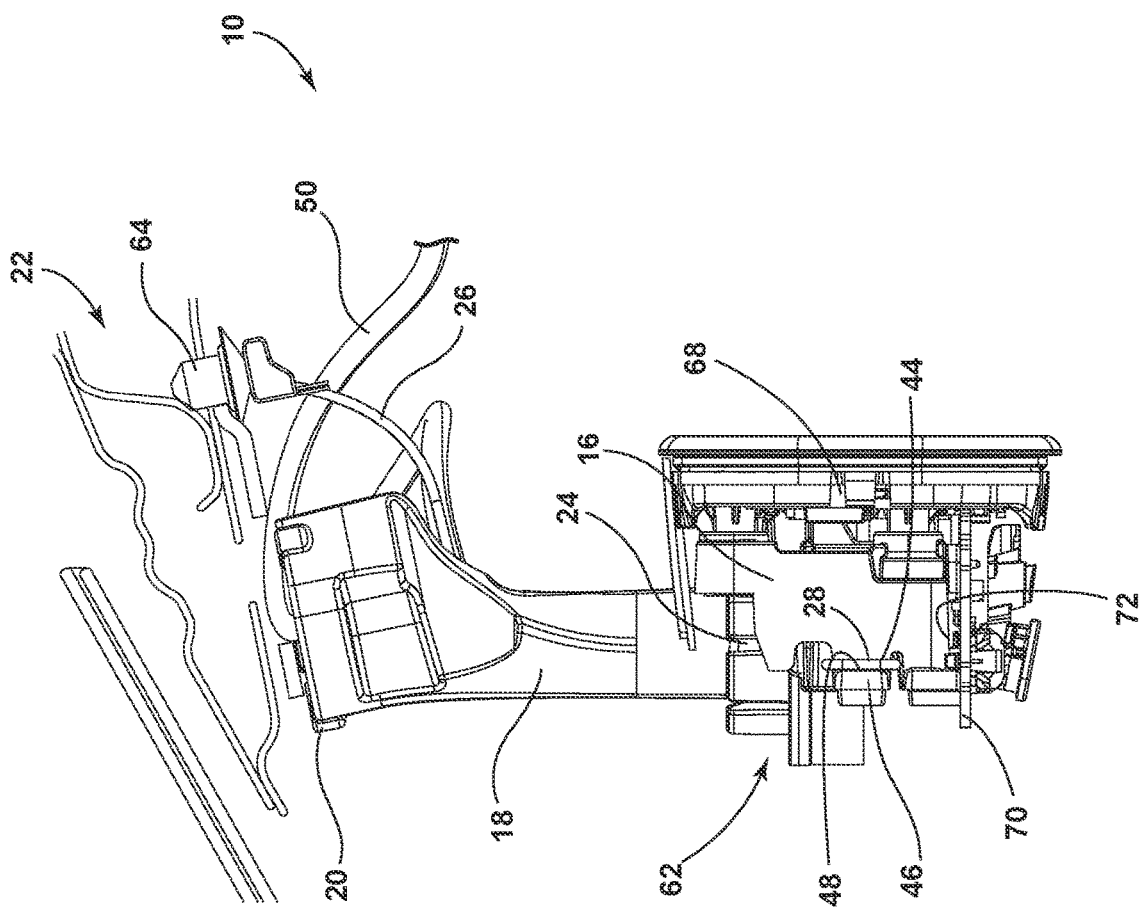
FIG. 3 is a side view of a rearview mirror assembly with a tether in accordance with an aspect of the present disclosure.

With reference now to FIGS. 1-3, the tether 26 may include a flexible elongated body, such as a cord, that extends between the first end 28 and the second end 32. The cord may be formed of a metal, such as a woven metal. The first end 28 may define a loop that wraps around a portion of the mounting bracket 16. More particularly, the mounting bracket 16 may define a post 44 that extends from the mounting bracket 16 to a head 46 that defines a chamfer 48 (FIG. 3). The first end 28 of the tether 26 is looped around the post 44 and retained by the chamfer 48. However, it should be appreciated that the tether 26 may be connected to other portions of the housing 14, and the first end 28 of the tether 26 may be secured to the mounting bracket 16 or other portions of the housing 14 by other means. For example, the first end 28 may define an opening for attachment of a mechanical fastener therethrough and into the mounting bracket 16 or other portions of the housing 14. In some embodiments, the mounting bracket 16 or other portions of the housing 14 may define a tether aperture (not shown) for threading or looping the first end 28 of the tether 26 therethrough.

With continued reference to FIGS. 1-3, the at least one electric component may further include a power supply wiring 50 that extends from the rearview mirror assembly 10 to a power hub 51 (FIG. 2) in the vehicle 12. In some embodiments, both the tether 26 and the power supply wiring 50 extend at least partially through the hollow interior 30 of the mounting member 18. More particularly, the mounting member 18 may include an interior wall 54 that defines the hollow interior 30. The hollow interior 30 may extend substantially from the connection end 24 to the mounting first end 20. For example, the mounting member 18 may define a first opening 56 at or near the mounting first end 20 for routing the power supply wiring 50 and the tether 26 into the hollow interior 30, and the connection end 24 may define a second opening 58 for routing the power supply wiring 50 and the tether 26 into the hollow interior 30. The mounting first end 20 may include an interface surface 60 that is substantially flat or angled for connection to the overhead structure 22 of the vehicle 12. The first opening 56 may be at least partially spaced between the interface surface 60 and the connection end 24. More particularly, the first opening 56 may define a slot 59 (e.g., a hole) partially defined by the interior wall 54. In this manner, the power supply wiring 50 and the tether 26 do not interfere with the connection between the interface surface 60 and the overhead structure 22 of the vehicle 12 and can exit the hollow interior 30 via the slot 59. In some embodiments, the tether 26 may have a length (e.g., an amount of slack) less than the power supply wiring 50 to ensure that the power supply wiring 50 remains connected if the rearview mirror assembly 10 becomes dislodged and caught by the tether 26. In this manner, the at least one electric component may continue to operate when the rearview mirror assembly 10 becomes dislodged. In some embodiments, the at least one electrical component may include a communication module that assists a user in contacting emergency services.

Figure 4:
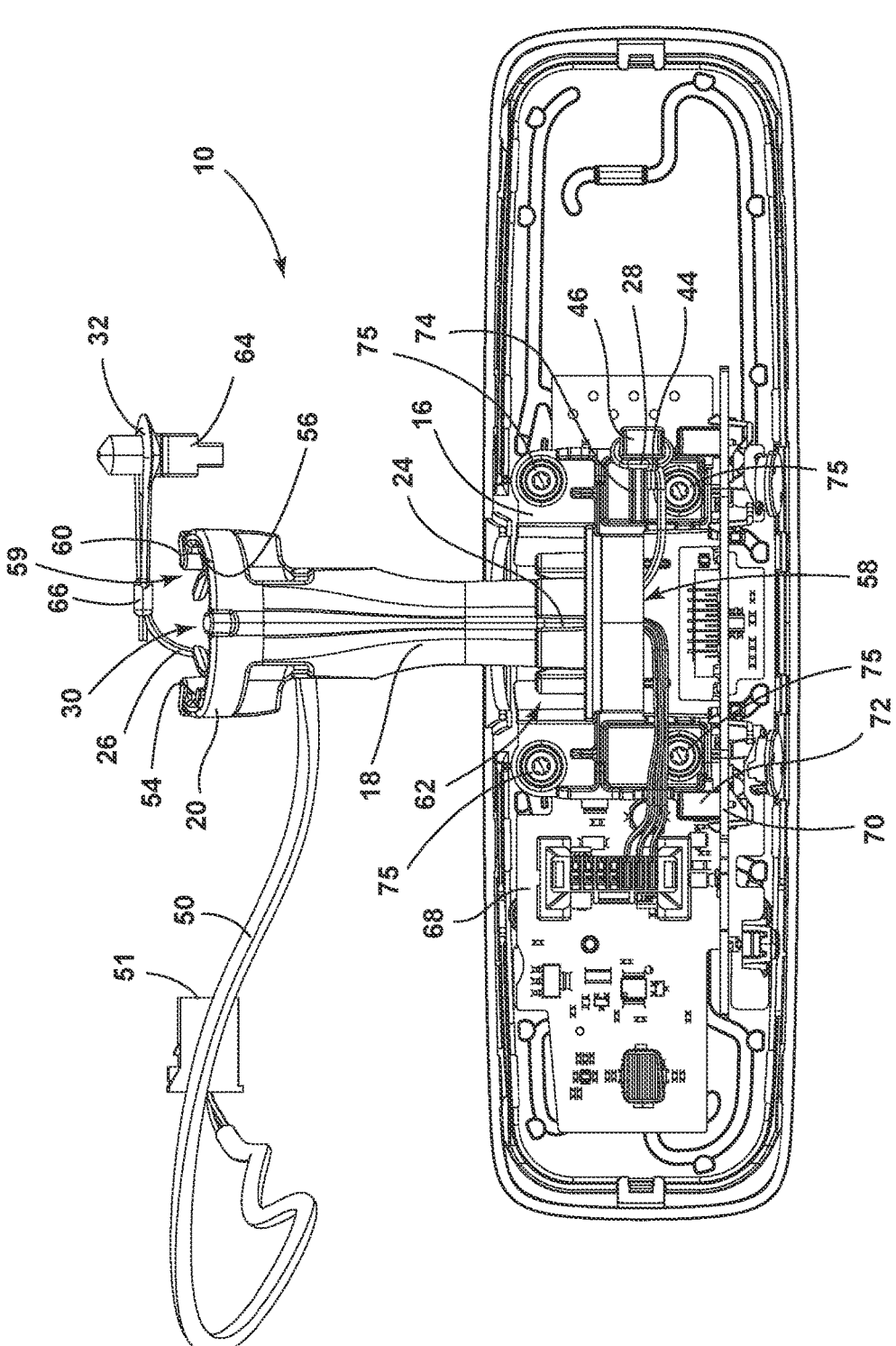
FIG. 4 is a rear view of a rearview mirror assembly including a pair of printed circuit boards and a tether in accordance with an aspect of the present disclosure.
Figure 5:
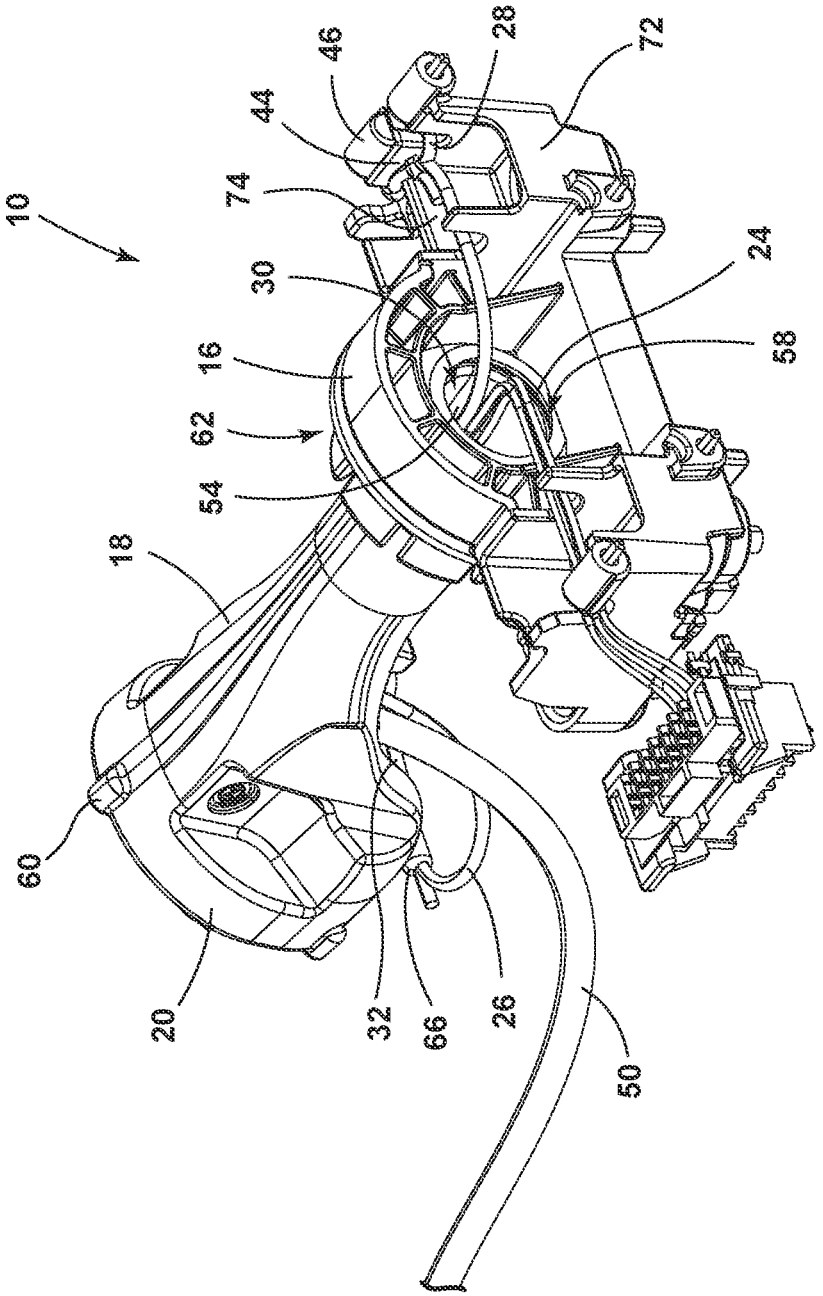
FIG. 5 is a lower perspective view of a mounting member with a tether in accordance with an aspect of the present disclosure.

With continued reference to FIGS. 3-5, the connection end 24 forms a joint 62 with the mounting bracket 16 permitting relative articulation between the mounting bracket 16 and the mounting member 18. More particularly, the connection end 24 may be at least partially spherically shaped and the mounting bracket 16 may define a pocket for accommodating the connection end 24 such that the joint 62 is a ball-type joint. The second end 32 of the tether 26 may be connected to a fastener 64 that is fastened to the overhead structure 22. The second end 32 may loop around the fastener 64. In some embodiments, the first and second ends 28, 32 of the tether 26 each include a collar 66 that secures the loops, respectively. The collar 66 may be adjustable to change the size of the loops and ensure tight connection (e.g., to the fastener 64 and head 46). Likewise, the collar 66 may be used to adjust the length of the tether 26 for rearview mirror assemblies of various sizes. In some embodiments, the tether 26 may be configured to include slack to permit movement of the mounting member 18 with respect to the housing 14.

With reference now to FIGS. 4 and 5, the rearview mirror assembly 10 may include a first printed circuit board ("PCB") 68 and a second PCB 70 that control the functionality of the at least one electronic component. The second PCB 70 may be located along a bottom surface 72 of the mounting bracket 16. In this manner, the post 44 may be spaced from the bottom surface 72 of the mounting bracket 16 and a structural rib 74 may extend from the post 44. In some embodiments, the structural rib 74 extends only partially along the post 44 to accommodate looping the first end 28 of the tether 26 around the chamfer 48. At least one mechanical fastener 75 may connect the mounting bracket 16 to the housing 14. In the depicted rearview mirror assembly 10, at least four mechanical fasteners 75 connect the mounting bracket 16 to the housing 14. In some embodiments, the power supply wiring 50 may connect to both the first and second PCBs 68, 70. In this manner, if the rearview mirror assembly 10 becomes dislodged, the at least one electric component may continue to operate from one or both PCBs 68, 70. In some embodiments, the power supply wiring 50 may connect one of the first and second PCBs 68, 70 and the first and second PCBs 68, 70 may be in communication with one another. In some embodiments, the communication module that assists a user in contacting emergency services may be operated from one or both PCBs 68, 70.

Figure 6:
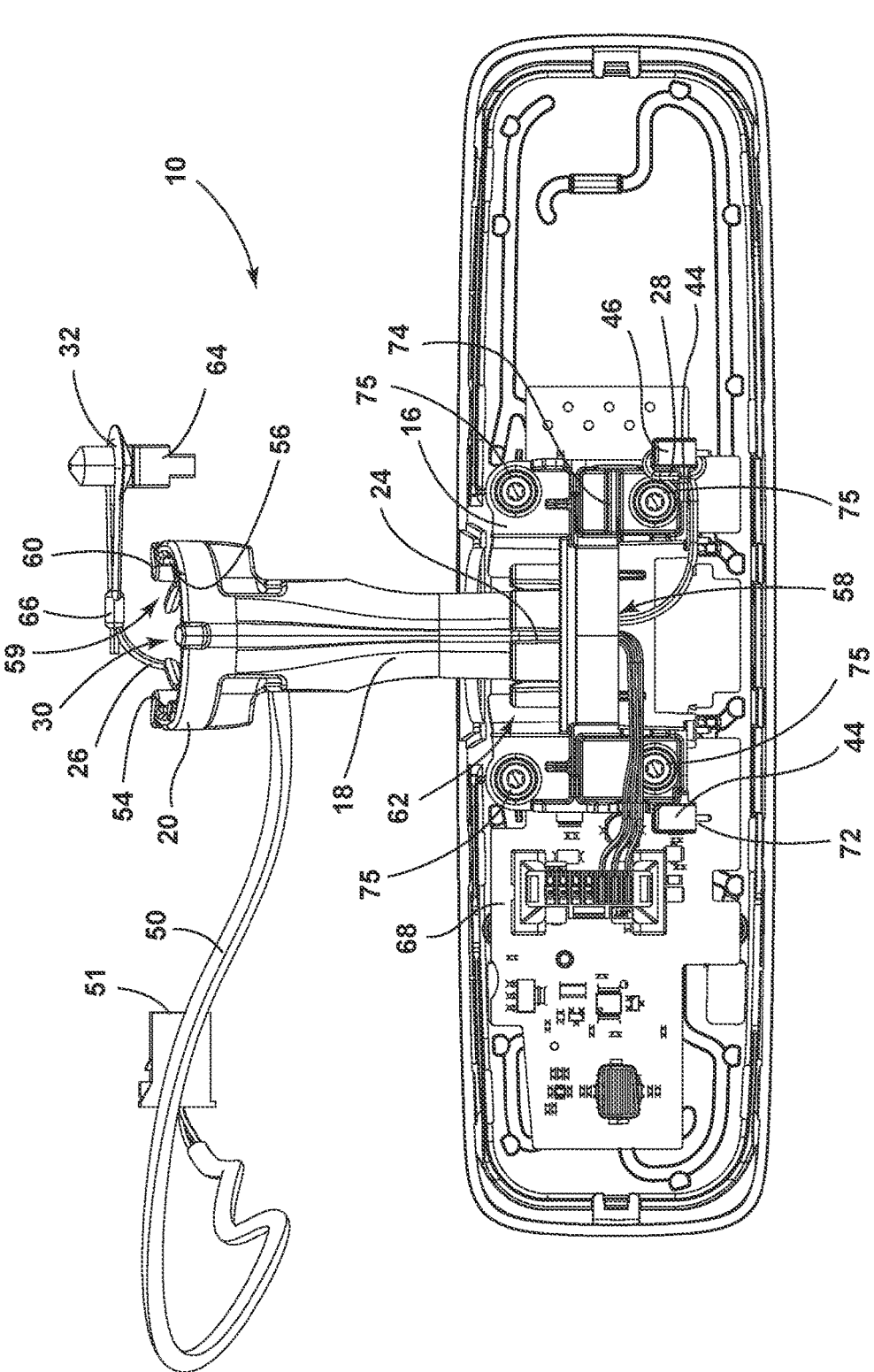
FIG. 6 is a rear view of a rearview mirror assembly including a single printed circuit board and a tether in accordance with an aspect of the present disclosure.

With reference now to FIG. 6, the second PCB 70 may be integrated with the first PCB 68 in a second construction, located somewhere else within the housing 14, or omitted. In this manner, the post 44 may be located near the bottom surface 72 of the mounting bracket 16 without interfering with the second PCB 70.

Figure 7:
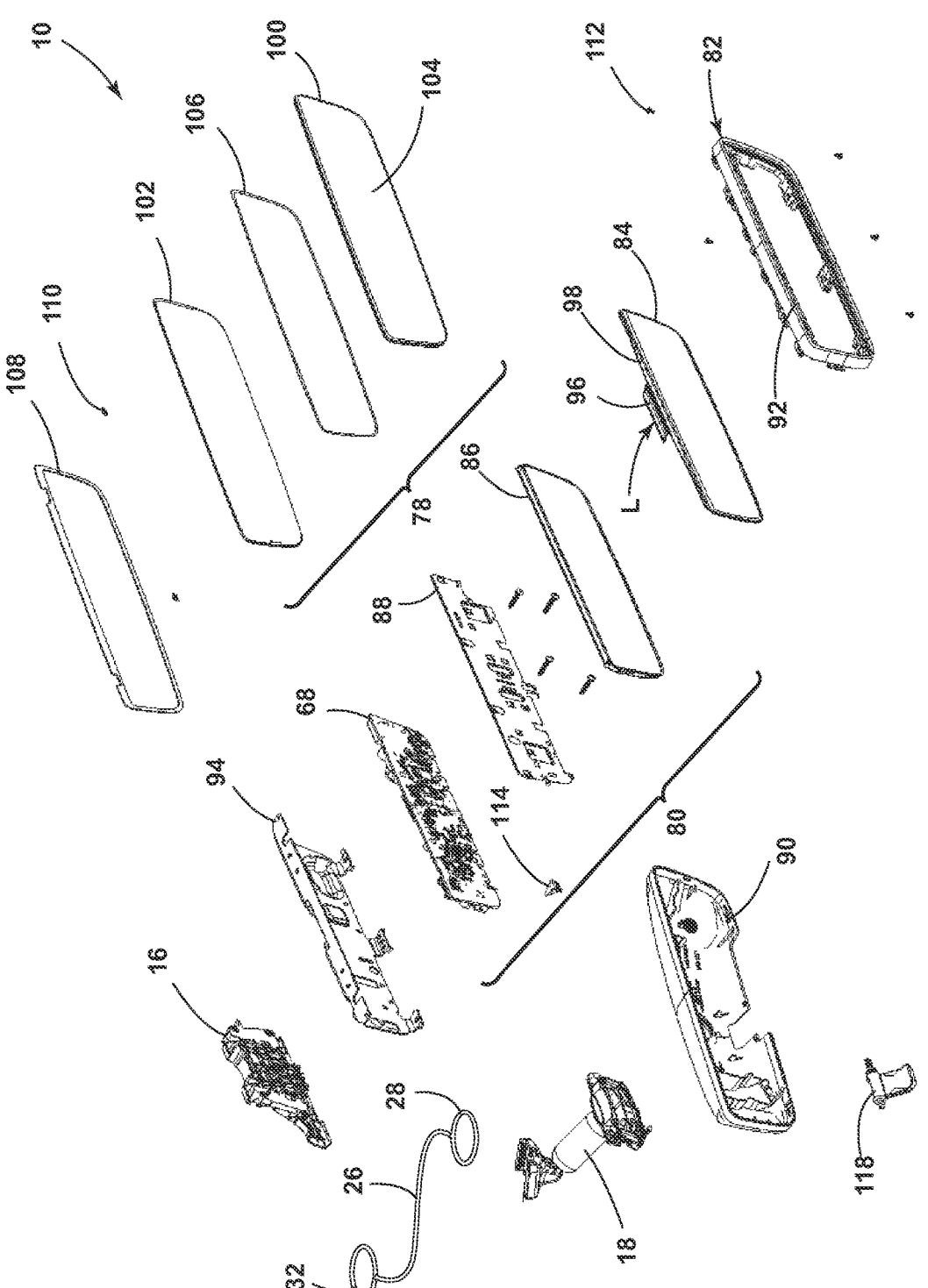
FIG. 7 is a disassembled top perspective view of a rearview mirror assembly with a tether in accordance with an aspect of the present disclosure.

With reference now to FIG. 7, the rearview mirror assembly 10 may include a partially reflective, partially transmissive element 78 (also referred to as a "glass element" herein) and a display assembly 80 that is viewed through the partially reflective, partially transmissive element 78. The rearview mirror assembly 10 further includes a bezel 82 that shields and supports the partially reflective, partially transmissive element 78 and the display assembly 80. A mounting member 18 may extend rearward from the bezel 82. The bezel 82 may be configured to be part of the outer profile of the partially reflective, partially transmissive element 78.

With continued reference to FIG. 7, the display assembly 80 may comprise several components, including the display 38, an optic block 86, a heat sink 88, and at least the first PCB 68. The housing 14 may include a rear housing 90, a front shield 92, and an intermediate shield 94, which shields and supports the partially reflective, partially transmissive element 78 and the display assembly 80. The rear housing 90, the intermediate shield 94, the front shield 92, and the components of the display assembly 80 include various retaining features to operably connect the several components of the display assembly 80 with the rear housing 90, the intermediate shield 94, the front shield 92, the bezel 82, and each other, and to provide support to the display assembly 80. Specifically, the rear housing 90 includes retaining features to operably connect the rear housing 90 to the intermediate shield 94 and the intermediate shield 94 includes retaining features to operably connect the display assembly 80. The bezel 82 and the front shield 92 likewise have retaining features to operably connect the bezel 82 and the front shield 92 to the display assembly 80. The retaining features generally include snap-fit connections, tab and slot connections, screw connections, and/or other known retaining features. In some embodiments, the intermediate shield 94 or other portions of the rearview mirror assembly 10 may include an ambient light sensor (not shown).

The display 38 may be a liquid crystal display (LCD), a light-emitting diode (LED), an organic light-emitting diode (OLED), plasma, digital light processing (DLP), or other display technology. The display 38 further includes a flexible electrical connector 96, which is operably mechanically and electrically connected with the first PCB 68. The flexible electrical connector 96 has a length "L" that is sufficient to extend over and wrap around the display module components between the display 38 and the first PCB 68, and has a width which extends substantially along a top edge 98 of the display 38. The ends of the flexible electrical connector 96 may be chamfered to ease manufacturing. The flexible electrical connector 96, when operably coupled to the first PCB 68, aids in securing the components along a top edge 98 of the display assembly 80.

The glass element 78 may include an electro-optic medium, which may include a prism-type construction or an electrochromic-type construction. In the prism-type construction, the electro-optic medium may generally include one glass element 78 having a varying thickness from top to bottom. The glass element 78 includes at least two glass substrates, which may include a front substrate 100, as well as a rear substrate 102. The front substrate 100 may include a first surface and a second surface, and the rear substrate 102 may include a third surface and a fourth surface. An electro-optic medium may be disposed between the front substrate 100 and the rear substrate 102. The rearview mirror assembly 10 has a viewing area 104 disposed on a front surface of the front substrate 100. The viewing area 104 may be a rectangular shape, a trapezoidal shape, or any custom contoured shape for utilitarian and aesthetic purposes. A border of the glass element 78 may incorporate a concealing layer 106 or edge treatment, such as a chrome ring, an opaque ring, or other similar finish, to conceal a peripheral area of the rear housing 90, the intermediate shield 94, and other elements located behind the glass element 78. A foam adhesive 108 may be connected to an inner side of the glass element 78. A pair of J-clips 110 (or other types of conductors) may electrically couple the glass element 78 to the first PCB 68. In the electrochromic-type construction, the electro-optic medium is an electrochromic medium, which includes at least one solvent, at least one anodic material, and at least one cathodic material. Typically, both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference. Electrochromic components, as described herein, include materials whose color or opacity are affected by electric current, such that when an electrical current is applied to the material, the color or opacity changes from a first phase to a second phase. During assembly, mechanical fasteners 112 may connect the components of the rearview mirror assembly 10.

A glare sensor optic 114 may be provided to the bottom side of the rear housing 90, in a location which receives light below the glass element 78 and below the display 38. The glare sensor optic 114 receives light from headlamps of a trailing vehicle, and measures information regarding the likely glare visible on the glass element 78 and communicates this information to the rearview mirror assembly 10 so that the rearview mirror assembly 10 can be optimized to allow viewing of the display 38 through the glass element 78. An outer perimeter of the display 38 may be located within an outer perimeter of the glass element 78. The glare sensor optic's (114) optical vertical/horizontal pattern may be symmetrical, so that orientation of the glare sensor optic 114 is not significant (e.g., a circular geometry). The glare sensor optic 114 could also have an asymmetrical vertical/horizontal light gathering pattern, in which case a keyed feature would be put into the lens to verify correct orientation in the rearview mirror assembly 10. The glare sensor optic 114 could also be packaged at least partially within the bezel 82 of the rearview mirror assembly 10 and have a light guide which is configured to propagate light to the glare sensor optic 114. The glare sensor optic 114 could also be an imager on a rear portion of the vehicle 12, wherein a signal representative of the received light is communicated from the glare sensor optic 114 to the rearview mirror assembly 10. In some embodiments, the glare sensor optic 114 may include a Full Display Mirror ("FDM") camera and image processing by components on the first PCB 68. An actuator device 118 tilts the glass element 78 relative to the vehicle 12 and/or the rear housing 90.

The disclosure herein is further summarized in the following paragraphs and is further characterized by combinations of any and all of the various aspects described therein.

According to one aspect of the present disclosure, a rearview mirror assembly for a vehicle includes a housing and a mounting bracket connected to the housing. A mounting member extends between a member first end configured to attach to an overhead structure of the vehicle and a connection end connected to the mounting bracket. A tether includes a first end connected to the mounting bracket. The tether extends at least partially through a hollow interior of the mounting member to a second end that is configured to attach to the overhead structure of the vehicle.

According to an aspect, a rearview mirror assembly includes at least one electronic component located in a housing.

According to another aspect, at least one electronic component includes a power supply wiring routed with a tether at least partially through a hollow interior of a mounting member.

According to yet another aspect, at least one electronic component includes an electro-optic assembly.

According to another aspect, at least one electronic component further includes a camera and a light source.

According to yet another aspect, a connection end of a mounting member forms a joint with a mounting bracket that permits relative articulation between the mounting bracket and the mounting member.

According to another aspect, a mounting bracket defines a post extending from the mounting bracket to a chamfer. A first end of a tether is looped around the post and retained by the chamfer.

According to yet another aspect, a structural rib extends from a post.

According to still yet another aspect, a tether includes a cord extending between a first end and a second end.

According to another aspect, a member first end defines a slot and a tether extends through the slot.

According to another aspect of the present disclosure, a rearview mirror assembly for a vehicle includes a housing and a mounting bracket connected to the housing. At least one electronic component and at least one at printed circuit board ("PCB") is located in the housing that controls the functionality of the at least one electronic component. A mounting member extends between a member first end configured to attach to an overhead structure of the vehicle and a connection end connected to the mounting bracket. A tether includes a cord having a first end connected to the mounting bracket. The cord extends at least partially through a hollow interior of the mounting member to a second end that is configured to attach to the overhead structure of the vehicle. A power supply wiring extends at least partially through a hollow interior of the mounting member and is operably coupled to the at least one PCB.

According to another aspect, a cord includes a length that provides an amount of slack less than an amount of slack than a power supply wiring.

According to yet another aspect, at least one electronic component includes at least one of an electro-optic assembly, a camera, or a light source.

According to still yet another aspect, at least one electronic component includes a communication module for contacting emergency services.

According to another aspect, at least one PCB includes a first PCB and a second PCB, both operably coupled to a power supply wiring.

According to yet another aspect of the present disclosure, a rearview mirror assembly for a vehicle includes a housing and a mounting bracket connected to the housing and defining a post. A mounting member extends between a member first end configured to attach to an overhead structure of the vehicle and a connection end connected to the mounting bracket. A tether includes a cord having a first end defining a loop extending around the post. The cord extends to a second end that is configured to attach to the overhead structure of the vehicle.

According to another aspect, a post defines a chamfer that retains a loop around the post.

According to yet another aspect, a collar is connected to a cord for adjusting a size of a loop.

According to still yet another aspect, a mounting bracket is connected to a housing with a plurality of mechanical fasteners.

According to another aspect, a rearview mirror assembly includes an electro-optic assembly, a camera, and a light source.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connectors or other elements of the system may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A rearview mirror assembly for a vehicle comprising:
a housing;
a mounting bracket connected to the housing;
a mounting member extending between a member first end configured to attach to an overhead structure of the vehicle and a connection end connected to the mounting bracket; and
a tether including a first end connected to the mounting bracket, the tether extending at least partially through a hollow interior of the mounting member to a second end that is configured to attach to the overhead structure of the vehicle, wherein the tether is configured to structurally anchor the housing to the overhead structure in an event where the housing becomes dislodged.

2. The rearview mirror assembly of claim 1, wherein the rearview mirror assembly includes at least one electronic component located in the housing.

3. The rearview mirror assembly of claim 2, wherein the at least one electronic component includes a power supply wiring routed with the tether at least partially through the hollow interior of the mounting member.

4. The rearview mirror assembly of claim 3, wherein the at least one electronic component includes an electro-optic assembly.

5. The rearview mirror assembly of claim 4, wherein the at least one electronic component further includes a camera and a light source.

6. The rearview mirror assembly of claim 1, wherein the connection end forms a joint with the mounting bracket permitting relative articulation between the mounting bracket and the mounting member.

7. The rearview mirror assembly of claim 1, wherein the mounting bracket defines a post extending from the mounting bracket to a chamfer, and the first end of the tether is looped around the post and retained by the chamfer.

8. The rearview mirror assembly of claim 7, wherein a structural rib extends from the post.

9. The rearview mirror assembly of claim 1, wherein the tether includes a cord formed of a woven material extending between the first end and the second end.

10. The rearview mirror assembly of claim 1, wherein at least one of the first end or the second end defines a loop to facilitate connection.

11. A rearview mirror assembly for a vehicle comprising:
a housing;
at least one electronic component and at least one printed circuit board ("PCB") in the housing that controls functionality of the at least one electronic component;

a mounting bracket connected to the housing;
a mounting member extending between a member first end configured to attach to an overhead structure of the vehicle and a connection end connected to the mounting bracket;
a tether including a cord having a first end connected to the mounting bracket, the cord extending at least partially through a hollow interior of the mounting member to a second end that is configured to attach to the overhead structure of the vehicle; and
a power supply wiring extending at least partially through a hollow interior of the mounting member and operably coupled to the at least one PCB.

12. The rearview mirror assembly of claim 11, wherein the cord includes a length that provides an amount of slack less than an amount of slack than the power supply wiring.

13. The rearview mirror assembly of claim 12, wherein the at least one electronic component includes at least one of an electro-optic assembly, a camera, or a light source.

14. The rearview mirror assembly of claim 12, wherein the at least one electronic component includes a communication module for contacting emergency services.

15. The rearview mirror assembly of claim 11, wherein the at least one PCB includes a first PCB and a second PCB, both operably coupled to the power supply wiring.

16. A rearview mirror assembly for a vehicle comprising:
a housing;
a mounting bracket connected to the housing and defining a post;
a mounting member extending between a member first end configured to attach to an overhead structure of the vehicle and a connection end connected to the mounting bracket; and
a tether including cord having a first end defining a loop extending around the post, the cord extending to a second end that is configured to attach to the overhead structure of the vehicle.

17. The rearview mirror assembly of claim 16, wherein the post defines a chamfer that retains the loop around the post.

18. The rearview mirror assembly of claim 16, wherein a collar is connected to the cord for adjusting a size of the loop.

19. The rearview mirror assembly of claim 16, wherein the mounting bracket is connected to the housing with a plurality of mechanical fasteners.

20. The rearview mirror assembly of claim 16, further including an electro-optic assembly, a camera, and a light source.

* * * * *